(12) United States Patent
Campbell

(10) Patent No.: US 8,400,007 B2
(45) Date of Patent: Mar. 19, 2013

(54) HYDROELECTRIC POWER SYSTEM

(76) Inventor: Charles E Campbell, Columbus, OH (US)

(*) Notice: Subject to any disclaimer, the term of this patent is extended or adjusted under 35 U.S.C. 154(b) by 346 days.

(21) Appl. No.: 12/843,150

(22) Filed: Jul. 26, 2010

(65) Prior Publication Data

US 2011/0025068 A1 Feb. 3, 2011

Related U.S. Application Data

(60) Provisional application No. 61/229,672, filed on Jul. 29, 2009.

(51) Int. Cl.
*F03B 13/00* (2006.01)
*H02P 9/04* (2006.01)

(52) U.S. Cl. ............................................. 290/54

(58) Field of Classification Search .............. 290/54, 290/43, 44, 52, 55; 60/398
See application file for complete search history.

(56) References Cited

U.S. PATENT DOCUMENTS

| 6,051,892 | A | 4/2000 | Toal |
| 6,420,794 | B1 | 7/2002 | Cao |
| 6,718,761 | B2 | 4/2004 | Merswolke |
| 6,791,221 | B1 | 9/2004 | Lan |
| 6,817,180 | B2 | 11/2004 | Newman |
| 6,861,766 | B2 | 3/2005 | Rembert |
| 7,222,487 | B1 | 5/2007 | Hinkley |
| 7,239,035 | B2 | 7/2007 | Garces |
| 7,246,492 | B2 | 7/2007 | Hendrix |
| 2005/0023836 | A1 | 2/2005 | Abdalla |
| 2006/0218917 | A1 | 10/2006 | Abou-Raphael |
| 2007/0039728 | A1 | 2/2007 | Coddou |
| 2007/0132247 | A1* | 6/2007 | Galayda et al. ............ 290/44 |
| 2008/0246282 | A1 | 10/2008 | Hathaway |

FOREIGN PATENT DOCUMENTS

| DE | 19521289 | 12/1996 |
| FR | 2640325 | 12/1988 |
| JP | 11-351118 | 12/1999 |
| JP | 2003-239841 | 8/2003 |
| JP | 2003-269314 | 9/2003 |
| KR | 2002-032457 | 5/2002 |
| WO | 97/01707 | 1/1997 |

* cited by examiner

*Primary Examiner* — Javaid Nasri
(74) *Attorney, Agent, or Firm* — Terra Nova Patent Law, PLLC; Mitchell A. Rossman

(57) ABSTRACT

A hydroelectric power system is provided. The hydroelectric power system includes a storage tank; a fluid; a penstock; an electric turbine generator, a transformer, an electric power grid system; a pump, and connecting conduit. A method of generating hydroelectric energy is also provided.

14 Claims, 6 Drawing Sheets

HYDROELECTRIC POWER SYSTEM

RELATED APPLICATIONS

This application claims priority to U.S. Provisional Patent Application Ser. No. 61/229,672 filed Jul. 29, 2009, which is hereby incorporated by reference in its entirety for all purposes.

BACKGROUND OF THE INVENTION

Water has long been used as a source of energy, beginning with the Greeks use of water wheels over 2,000 years ago. For over a century, hydropower has been used to generate electricity from falling water. Hydroelectric power stems from the process of using water's energy as it flows from higher to lower elevation, rotating hydraulic turbines to create electricity. Tidal power, although not widely used, can also generate hydroelectricity by utilizing the same principle.

Hydropower is considered to be a clean, renewable source of energy, emitting no greenhouse gases when compared to fossil fuels. It has a low operating cost once installed and can be highly automated. An additional benefit is that the power is generally available on demand since the flow of water can be controlled. Using hydroelectric power also has disadvantages. Dams can block fish passage to spawning grounds or to the ocean, although many plants now have measures in place to help reduce this impact. The diversion of water can impact stream flow, or even cause a river channel to dry out, degrading both aquatic and streamside habitats.

Hydroelectric plants can also have an impact on water quality by lowering the amount of dissolved oxygen in the water. In the reservoir, sediments and nutrients can be trapped and the lack of water flow can create a situation for undesirable growth and the spread of algae and aquatic weeds.

While the use of water to produce electricity is an attractive alternative to fossil fuels, the technology must still overcome obstacles related to space requirements, building costs, environmental impacts, and the displacement of people. Further, possible locations for new hydropower projects are very limited.

What is needed is a hydroelectric power system that can be used without the use of a river, lake, or dam.

SUMMARY OF THE INVENTION

The hydroelectric power system, as described herein, produces electricity from water through a process that does not emit carbon dioxide. The hydroelectric power system uses the gravitational force of water flowing through turbines to rotate generators to produce electricity. The hydroelectric power system eliminates the need for a river, dam or lake as the source of water and the need for long distance transmission lines. The water is recycled, allowing this hydroelectric power system to be located in large metropolitan cities, where the demand for electricity is the greatest. After the water flows through the turbine, it is pumped and suctioned back to the water storage tank to be reused. As such, the hydroelectric power system creates a sustained source or clean renewable energy at a low cost to individual residential, commercial, and industrial customers.

The hydroelectric power system may be of any size, from large units for commercial buildings to small units for homes and can store converted energy for use as needed. The electrical output of the hydroelectric power system may be increased by providing additional storage tanks, additional electric turbine generators, additional pumps, or a combination thereof. The hydroelectric power system is a sealed system that utilizes the vacuum power inherent in such a system for aiding in the return of the fluid back to the storage tank. Furthermore, the hydroelectric power system is simple and easy to use and economical in cost to manufacture.

The hydroelectric power system and the methods described herein may also be used advantageously to provide backup power until local electrical service is restored during disruptions caused by storms, floods, hurricanes, tornadoes, and other power outages. Further, the hydroelectric power system described herein may advantageously generate electric power when other renewable energy sources might not be able, for example, when the wind stops, when the sun does not shine, or a combination thereof.

The hydroelectric power system, as described herein, is a self-contained system, because all the water draining down, out of the electric turbine and optional second storage tanks is pumped back up to the first storage tank to form a closed loop circulation. A self-contained system, as such, does not need to communicate with an external source to operate, for example, a down-flowing stream to drain the water from the electric turbine, or a body of water upstream to feed the electric turbine. As such, the hydroelectric power system is a self-sufficient independent system to provide electrical power consumers, whether they are present in a large urban area or remote location. Also for being self-contained, capacity of the hydroelectric power system can vary not only with the size of a unit hydroelectric power system, but also with the number of installed units to meet various electrical demands.

The present invention provides a hydroelectric power system. The hydroelectric power system includes:
  a first storage tank having an inlet and an outlet;
  a fluid;
  a penstock having an inlet and an outlet, wherein the inlet of the penstock is placed in fluid communication with the outlet of the first storage tank, and wherein the penstock comprises a first flow controller;
  an electric turbine generator having an inlet and an outlet, wherein the inlet of the electric turbine is placed in fluid communication with the outlet of the penstock;
  a transformer electrically coupled to the electric turbine generator and to an electric power grid system;
  a pump having an inlet and an outlet;
  a first conduit having an inlet and an outlet, wherein the inlet of the first conduit is placed in fluid communication with the outlet of the electric turbine generator and the outlet of the first conduit is placed in fluid communication with the inlet of the pump, and wherein the first conduit comprises a second flow controller; and
  a second conduit having an inlet and an outlet, wherein the inlet of the second conduit is placed in fluid communication with the outlet of the pump and the outlet of the second conduit is placed in fluid communication with the inlet of the first storage tank, and wherein the second conduit comprises a third flow controller.

In one embodiment, the hydroelectric power system further includes a feedback pipe having an inlet and an outlet, wherein the inlet of the feedback pipe is placed in fluid communication with the second conduit between the third flow controller and inlet of the first storage tank recycling the fluid back into the third flow controller. In one embodiment, the recycling the fluid back to the third flow controller occurs when the third flow controller determines that the fluid pressure within the third conduit is below a predetermined value.

In one embodiment, the hydroelectric power system further includes a second storage tank having an inlet and an outlet; wherein the second storage tank is placed in fluid communication with the outlet of the first conduit and the inlet of the pump. In one embodiment, the hydroelectric power system further includes a switch to connect an electric power output generated by the electric turbine generator to the electric power grid system.

In one embodiment, the first storage tank, the penstock, the electric turbine generator, the pump, the first conduit, and the second conduit form a sealed container with the fluid contained therein. In one embodiment, the hydroelectric power system further includes a solar power generator, a wind power generator, a geothermal power generator, a domestic water inlet power generator, a domestic wastewater power generator, a commercial utility electrical power source, or a combination thereof to drive the pump.

In one embodiment, the hydroelectric power system further includes a controller electrically coupled to a switch for connecting the electric power output of the electric turbine generator, for determining an electrical demand of the electric power grid system and for controlling the electric power output to satisfy the demand of the electric power grid system or of the hydroelectric power system.

In one embodiment, the hydroelectric power system further includes a fluid is water. In one embodiment, the penstock conveys the fluid by gravity to drive the electric turbine generator.

The present invention also provides a method of generating hydroelectric energy from a hydroelectric power system. The method includes;
providing a hydroelectric power system comprising
a first storage tank having an inlet and an outlet;
a fluid;
a penstock having an inlet and an outlet, wherein the inlet of the penstock is placed in fluid communication with the outlet of the first storage tank, and wherein the penstock comprises a first flow controller;
an electric turbine generator having an inlet and an outlet, wherein the inlet of the electric turbine is placed in fluid communication with the outlet of the penstock;
a transformer electrically coupled to the electric turbine generator and to an electric power grid system;
a pump having an inlet and an outlet;
a first conduit having an inlet and an outlet, wherein the inlet of the first conduit is placed in fluid communication with the outlet of the electric turbine generator and the outlet of the first conduit is placed in fluid communication with the inlet of the pump, and wherein the first conduit comprises a second flow controller; and
a second conduit having an inlet and an outlet, wherein the inlet of the second conduit is placed in fluid communication with the outlet of the pump and the outlet of the second conduit is placed in fluid communication with the inlet of the first storage tank, and wherein the second conduit comprises a third flow controller;
releasing the fluid from the first storage tank through the penstock, the electric turbine generator, and the first conduit connected to the pump;
pumping the fluid from the pump through the second conduit to the first storage tank to replenish the first storage tank; and
switching the electrical power generated by the hydroelectric power system into the electric power grid system.
In one embodiment, the step of switching further includes:
determining the electric power output of the hydroelectric power system;
sensing a generation of a surplus electric power output by the hydroelectric power system; and
connecting the surplus electric power output to the electric power grid system.

In one embodiment, the fluid is water.

In one embodiment, the hydroelectric power system further includes a feedback pipe having an inlet and an outlet, wherein the inlet of the feedback pipe is placed in fluid communication with the second conduit between the third flow controller and inlet of the first storage tank recycling the fluid back into the third flow controller.

In one embodiment, the hydroelectric power system further includes a second storage tank having an inlet and an outlet; wherein the second storage tank is placed in fluid communication with the outlet of the first conduit and the inlet of the pump.

The present invention provides a hydroelectric power system. The hydroelectric power system includes:
a first storage tank having an inlet and an outlet;
a fluid;
a penstock having an inlet and an outlet, wherein the inlet of the penstock is placed in fluid communication with the outlet of the first storage tank, and wherein the penstock comprises a first flow controller;
an electric turbine generator having an inlet and an outlet, wherein the inlet of the electric turbine is placed in fluid communication with the outlet of the penstock;
a transformer electrically coupled to the electric turbine generator and to an electric power grid system;
a pump having an inlet and an outlet;
a first conduit having an inlet and an outlet, wherein the inlet of the first conduit is placed in fluid communication with the outlet of the electric turbine generator and the outlet of the first conduit is placed in fluid communication with the inlet of the pump, and wherein the first conduit comprises a second flow controller; and
a second conduit having an inlet and an outlet, wherein the inlet of the second conduit is placed in fluid communication with the outlet of the pump and the outlet of the second conduit is placed in fluid communication with the inlet of the first storage tank, and wherein the second conduit comprises a third flow controller; and
a feedback pipe having an inlet and an outlet, wherein the inlet of the feedback pipe is placed in fluid communication with the second conduit between the third flow controller and inlet of the first storage tank recycling the fluid back into the third flow controller,
wherein the recycling the fluid back to the third flow controller occurs when the third flow controller determines that the fluid pressure within the third conduit is below a predetermined value,
wherein the first storage tank, the penstock, the electric turbine generator, the second storage tank, the pump, the first conduit, the second conduit, the third conduit, and the feedback pipe form a sealed container with the fluid contained therein.

The hydroelectric power system includes a first storage tank having an inlet and an outlet; a fluid; a penstock having an inlet and an outlet, wherein the inlet of the penstock is placed in fluid communication with the outlet of the first storage tank; an electric turbine generator having an inlet and an outlet, wherein the inlet of the electric turbine is placed in fluid communication with the outlet of the penstock; a transformer electrically coupled to the electric turbine generator and an electric power grid system; a pump having an inlet and an outlet; a first conduit having an inlet and an outlet, wherein the inlet of the first conduit is placed in fluid communication with the outlet of the electric turbine generator and the outlet of the first conduit is placed in fluid communication with the inlet of the pump; and a second conduit having an inlet and an outlet, wherein the inlet of the second conduit is placed in fluid communication with the outlet of the pump and the outlet of the second conduit is placed in fluid communication with the inlet of the first storage tank.

The present invention also provides a hydroelectric power system. The hydroelectric power system includes a first storage tank having an inlet and an outlet; a fluid; a penstock having an inlet and an outlet, wherein the inlet of the penstock is placed in fluid communication with the outlet of the first storage tank; an electric turbine generator having an inlet and an outlet, wherein the inlet of the electric turbine is placed in fluid communication with the outlet of the penstock; a transformer electrically coupled to the electric turbine generator and an electric power grid system; a pump having an inlet and an outlet; a first conduit having an inlet and an outlet, wherein the inlet of the first conduit is placed in fluid communication with the outlet of the electric turbine generator and the outlet of the first conduit is placed in fluid communication with the inlet of the pump; and a second conduit having an inlet and an outlet, wherein the inlet of the second conduit is placed in fluid communication with the outlet of the pump and the outlet of the second conduit is placed in fluid communication with the inlet of the first storage tank.

The present invention provides a hydroelectric power system. The hydroelectric power system includes a first storage tank having an inlet and an outlet; a fluid; a penstock having an inlet and an outlet, wherein the inlet of the penstock is placed in fluid communication with the outlet of the first storage tank, and wherein the penstock includes a first flow controller; an electric turbine generator having an inlet and an outlet, wherein the inlet of the electric turbine is placed in fluid communication with the outlet of the penstock; a transformer electrically coupled to the electric turbine generator and an electric power grid system; a pump having an inlet and an outlet; a first conduit having an inlet and an outlet, wherein the inlet of the first conduit is placed in fluid communication with the outlet of the electric turbine generator and the outlet of the first conduit is placed in fluid communication with the inlet of the pump, and wherein the first conduit includes a second flow controller; a second conduit having an inlet and an outlet, wherein the inlet of the second conduit is placed in fluid communication with the outlet of the pump and the outlet of the second conduit is placed in fluid communication with the inlet of the first storage tank, and wherein the second conduit includes a third flow controller; and a feedback pipe between the third flow controller and the outlet of the third conduit for recycling the fluid back to the third flow controller.

The present invention provides a hydroelectric power system. The hydroelectric power system includes a first storage tank having an inlet and an outlet; a fluid; a penstock having an inlet and an outlet, wherein the inlet of the penstock is placed in fluid communication with the outlet of the first storage tank, and wherein the penstock includes a first flow controller; an electric turbine generator having an inlet and an outlet, wherein the inlet of the electric turbine is placed in fluid communication with the outlet of the penstock; a transformer electrically coupled to the electric turbine generator and an electric power grid system; a pump having an inlet and an outlet; a second storage tank having an inlet and an outlet; a first conduit having an inlet and an outlet, wherein the inlet of the first conduit is placed in fluid communication with the outlet of the electric turbine generator and the outlet of the first conduit is placed in fluid communication with the inlet of the second storage tank, and wherein the first conduit includes a second flow controller; a second conduit having an inlet and an outlet, wherein the inlet of the second conduit is placed in fluid communication with the outlet of the second storage tank and the outlet of the second conduit is placed in fluid communication with the inlet of the pump; and a third conduit having an inlet and an outlet; wherein the inlet of the third conduit is placed in fluid communication with the outlet of the pump and the outlet of the third conduit is placed in fluid communication with the inlet of the first storage tank, and wherein the third conduit includes a third flow controller.

The present invention provides a hydroelectric power system. The hydroelectric power system includes a first storage tank having an inlet and an outlet; a fluid; a penstock having an inlet and an outlet, wherein the inlet of the penstock is placed in fluid communication with the outlet of the first storage tank, and wherein the penstock includes a first flow controller; an electric turbine generator having an inlet and an outlet, wherein the inlet of the electric turbine is placed in fluid communication with the outlet of the penstock; a transformer electrically coupled to the electric turbine generator and an electric power grid system; a pump having an inlet and an outlet; a second storage tank having an inlet and an outlet; a first conduit having an inlet and an outlet, wherein the inlet of the first conduit is placed in fluid communication with the outlet of the electric turbine generator and the outlet of the first conduit is placed in fluid communication with the inlet of the second storage tank, and wherein the first conduit includes a second flow controller; a second conduit having an inlet and an outlet, wherein the inlet of the second conduit is placed in fluid communication with the outlet of the second conduit and the outlet of the second conduit is placed in fluid communication with the inlet of the pump; a third conduit having an inlet and an outlet; wherein the inlet of the third conduit is placed in fluid communication with the outlet of the pump and the outlet of the third conduit is placed in fluid communication with the inlet of the first storage tank, and wherein the third conduit includes a third flow controller; and a feedback pipe between the third flow controller and the outlet of the third conduit for recycling the fluid back to the third flow controller.

BRIEF DESCRIPTION OF THE DRAWINGS

Embodiments of the invention may be best understood by referring to the following description and accompanying drawings, which illustrate such embodiments. In the drawings.

Figure 1:
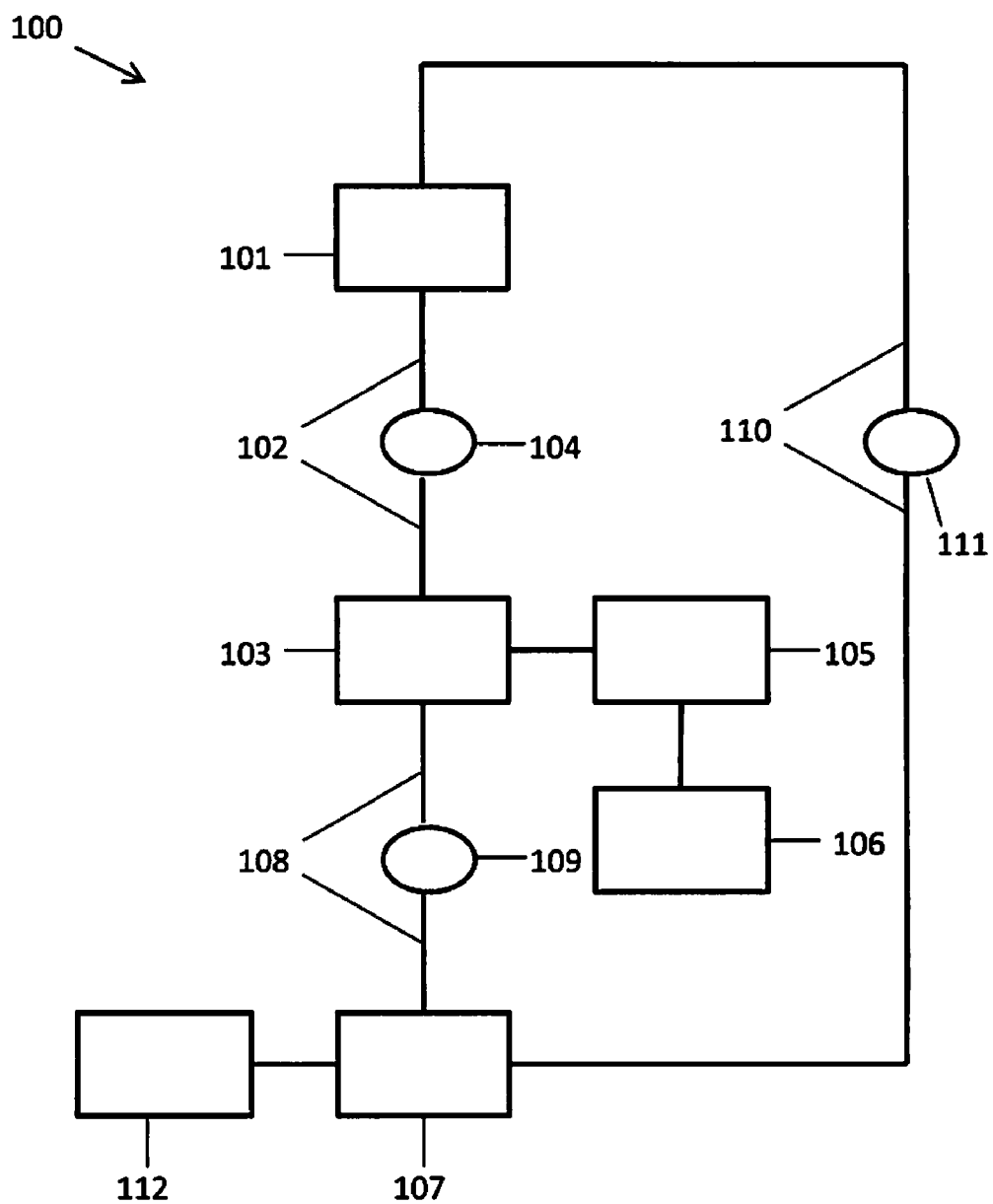
FIG. 1 is a drawing illustrating an exemplary hydroelectric power system.

The drawings are not necessarily to scale. Like numbers used in the figures refer to like components, steps and the like. However, it will be understood that the use of a number to refer to a component in a given figure is not intended to limit the component in another figure labeled with the same number.

DETAILED DESCRIPTION OF THE INVENTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

The referenced items are provided solely for their disclosure prior to the filing date of the present application. Nothing herein is to be construed as an admission that the present invention is not entitled to antedate such material by virtue of prior invention.

Unless otherwise indicated, the words and phrases presented in this document have their ordinary meanings to one of skill in the art. Such ordinary meanings can be obtained by reference to their use in the art and by reference to general and scientific dictionaries, for example, *Webster's Third New International Dictionary*, Merriam-Webster Inc., Springfield, Mass., 1993, and *The American Heritage Dictionary of the English Language*, Houghton Mifflin, Boston Mass., 1981.

The following explanations of certain terms are meant to be illustrative rather than exhaustive. These terms have their ordinary meanings given by usage in the art and in addition include the following explanations.

As used herein, the term "about" refers to a variation of 10 percent of the value specified; for example about 50 percent carries a variation from 45 to 55 percent.

As used herein, the term "and/or" refers to any one of the items, any combination of the items, or all of the items with which this term is associated.

As used herein, the singular forms "a," "an," and "the" include plural reference unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements, or use of a "negative" limitation.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The hydroelectric power system, as described herein, produces electricity from water through a process that does not emit carbon dioxide. The hydroelectric power system uses the gravitational force of water flowing through turbines to rotate generators to produce electricity. The hydroelectric power system eliminates the need for a river, dam or lake as the source of water and the need for long distance transmission lines. The water is recycled, allowing this hydroelectric power system to be located in large metropolitan cities, where the demand for electricity is the greatest. After the water flows through the turbine, it is pumped and suctioned back to the water storage tank to be reused. As such, the hydroelectric power system creates a sustained source or clean renewable energy at a low cost to individual residential, commercial, and industrial customers.

The hydroelectric power system may be of any size, from large units for commercial buildings to small units for homes and can store converted energy for use as needed. The electrical output of the hydroelectric power system may be increased by providing additional storage tanks, additional electric turbine generators, additional pumps, or a combination thereof. The hydroelectric power system is a sealed system that utilizes the vacuum power inherent in such a system for aiding in the return of the fluid back to the storage tank. Furthermore, the hydroelectric power system is simple and easy to use and economical in cost to manufacture.

The hydroelectric power system and the methods described herein may also be used advantageously to provide backup power until local electrical service is restored during disruptions caused by storms, floods, hurricanes, tornadoes, and other power outages. Further, the hydroelectric power system described herein may advantageously generate electric power when other renewable energy sources might not be able, for example, when the wind stops, when the sun does not shine, or a combination thereof.

The hydroelectric power system, as described herein, is a self-contained system, because all the water draining down, out of the electric turbine and optional second storage tanks is pumped back up to the first storage tank to form a closed loop circulation. A self-contained system, as such, does not need to communicate with an external source to operate, for example, a down-flowing stream to drain the water from the electric turbine, or a body of water upstream to feed the electric turbine. As such, the hydroelectric power system is a self-sufficient independent system to provide electrical power consumers, whether they are present in a large urban area or remote location. Also for being self-contained, capacity of the hydroelectric power system can vary not only with the size of a unit hydroelectric power system, but also with the number of installed units to meet various electrical demands.

FIG. 1 illustrates an exemplary hydroelectric power system 100. The hydroelectric power system 100 includes a storage tank 101. The penstock 102 connects the storage tank 101 to an electric turbine generator 103. The penstock 102 contains the first flow controller 104, which is used to regulate the flow of the fluid from the storage tank 101 to the electric turbine generator 103. The electric turbine generator 103 is electrically coupled to a transformer 105, which is electrically coupled to an electrical power grid system 106. The electric turbine generator 103 is also connected to a pump 107 via the first conduit 108. The first conduit 108 also contains the second flow controller 109. The pump 107 is placed in fluid communication with the second conduit 110 for pumping the fluid from the electric turbine generator 103 through the second conduit 110 to the storage tank 101. The third flow controller 111 is also connected in-line to the second conduit 110 for regulating fluid movement through the second conduit 110. An external power source 112 supplies power to the pump 107. The electric turbine generator 103 is placed in fluid communication with supply electrical energy converted from the potential energy stored in the fluid contained in the storage tank 101 to the transformer 105 and out to the electrical power grid system 106.

The operation of the hydroelectric power system 100 shown in FIG. 1 is as follows. The hydroelectric power system 100 is self contained sealed system including a viscous fluid therein. The hydroelectric power system 100 must be filled with a predetermined amount of fluid necessary for the hydroelectric power system 100 to operate. The pump 107 is turned on and begins pumping fluid from the electric turbine generator 103 up to the storage tank 101. When the fluid reaches the storage tank 101, gravity causes the fluid to flow into the penstock 102. As the fluid passes through the penstock 102 and the electric turbine generator 103, the fluid turns the turbine to power an electric turbine generator 103. Afterward, the fluid passes through the first conduit 108 and into the pump 107. Then, the fluid is pumped back to the storage tank 101 and the process repeats. As the fluid continues to recycle through the hydroelectric power system 100 a vacuum pressure builds up within the hydroelectric power system 100. This vacuum aids the pump 107 in recycling the fluid through the hydroelectric power system 100 and reduces the energy needed to operate the pump 107.

Figure 2:
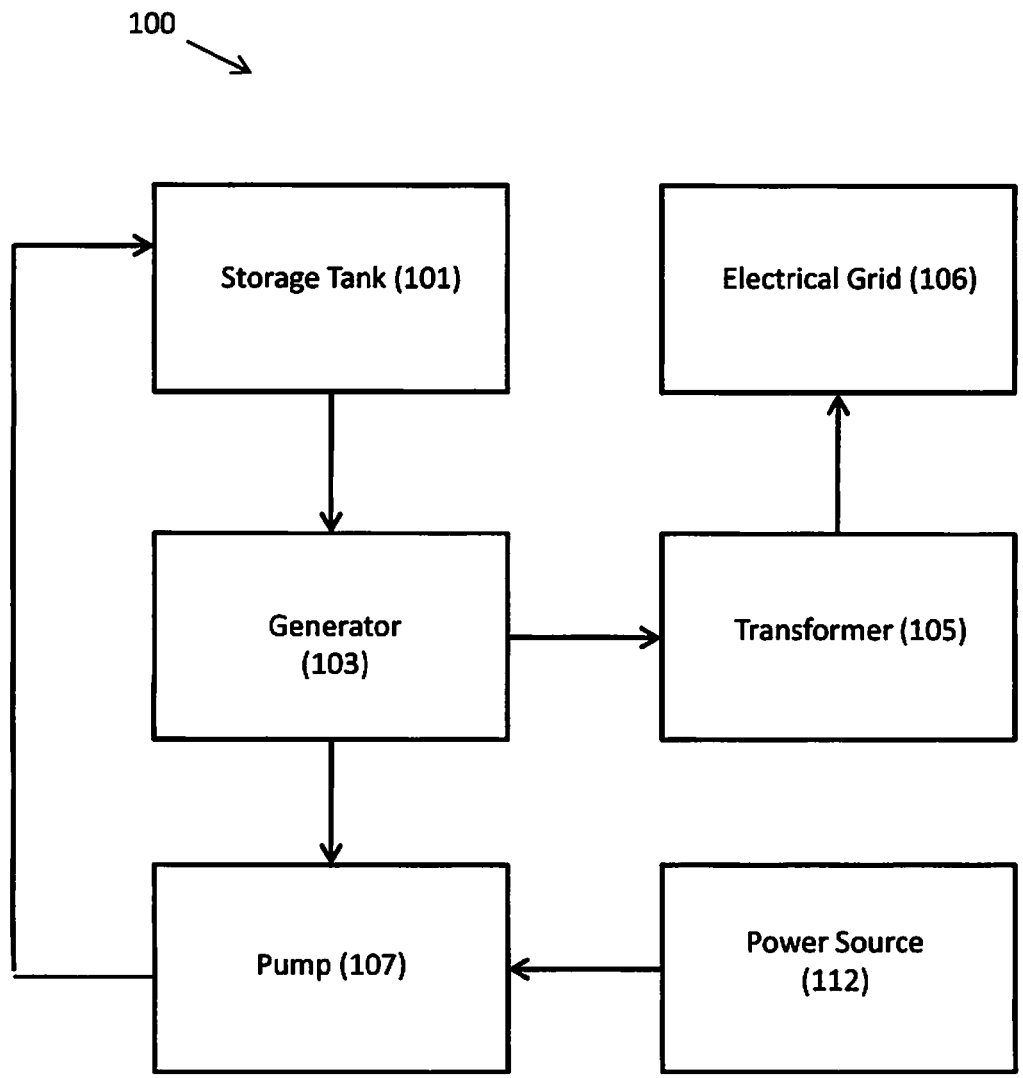
FIG. 2 is a block diagram illustrating the interrelationship between the elements of an exemplary hydroelectric power system.

FIG. 2 is a block diagram illustrating the interrelationship between the elements of an exemplary hydroelectric power system 100. The storage tank 101 receives the fluid flowing through the hydroelectric power system 100 and supplies it through the electric turbine generator 103 to the pump 107. The electric turbine generator 103 converts the energy of the flowing fluid into electrical energy. The pump 107 pumps the fluid flowing from the electric turbine generator 103 back up to the storage tank 101 so that the fluid may be recycled. This closed and sealed system creates a vacuum that aids the flow of the fluid through the hydroelectric power system 100. As a result, the amount of energy consumed by the pump 107 is reduced.

Figure 3:
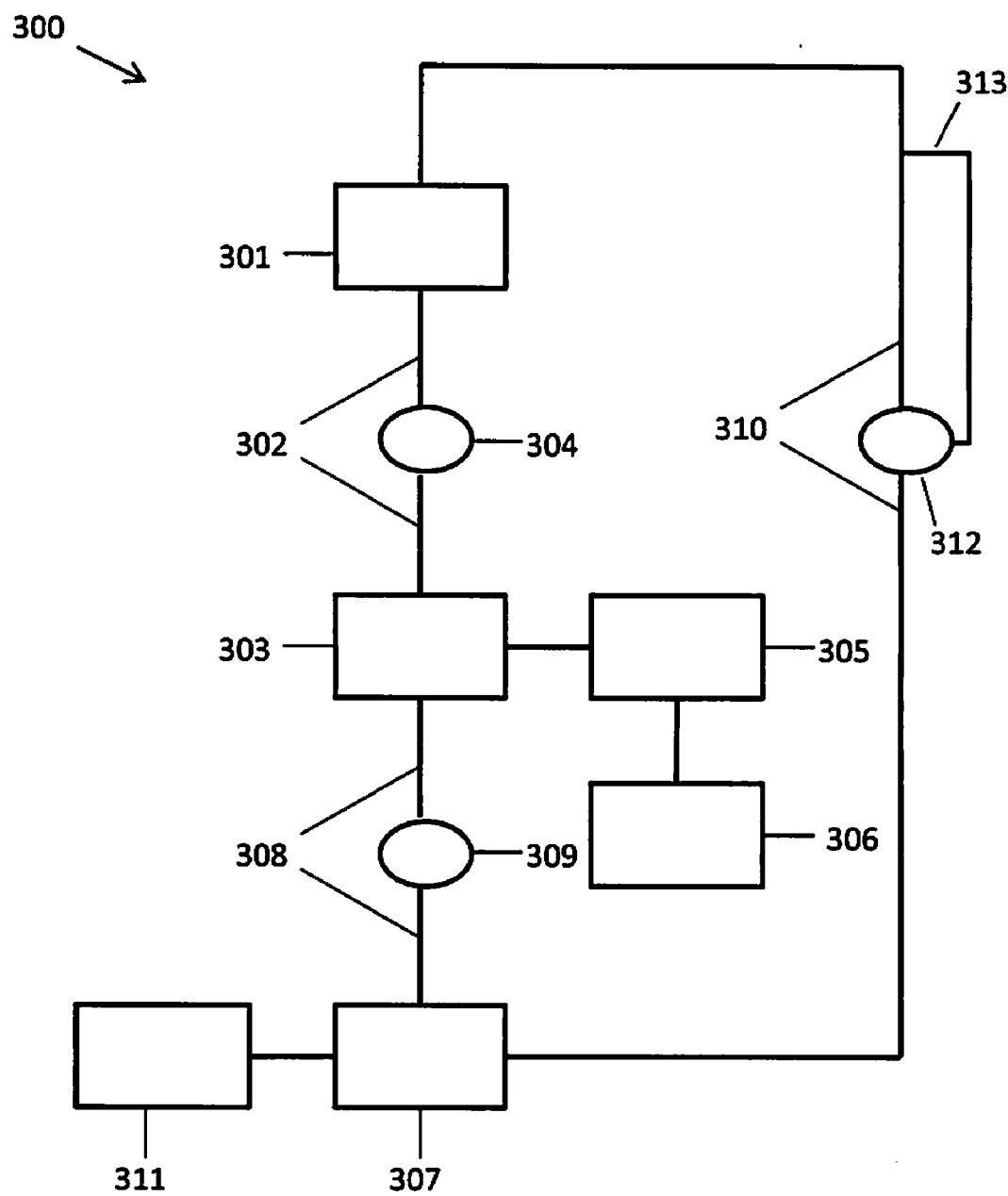
FIG. 3 is a drawing illustrating an exemplary hydroelectric power system.

FIG. 3 illustrates an exemplary hydroelectric power system 300. The hydroelectric power system 300 includes a storage tank 301. The penstock 302 connects the storage tank 301 to an electric turbine generator 303. The penstock 302 contains the first flow controller 304, which is used to regulate the flow of the fluid from the storage tank 301 to the electric turbine generator 303. The electric turbine generator 303 is electrically coupled to a transformer 305, which is electrically coupled to an electrical power grid system 306. The electric turbine generator 303 is also connected to a pump 307 via the first conduit 308, which also contains the second flow controller 309. The pump 307 is placed in fluid communication with the second conduit 310 for pumping the fluid from the electric turbine generator 303 through the second conduit 310 to the storage tank 301. The external power source 311 supplies power to the pump 307. The in-line third flow controller 312 is also connected in-line to the second conduit 310 for regulating fluid movement through the second conduit 310. A feedback pipe 313 is connected between the top portion of the second conduit 310 and the third flow controller 312 for recycling fluid when the third flow controller 312 determines that the fluid pressure in the second conduit 310 is below a predetermined value. The third flow controller 312 will control a valve (not shown) located at the connection point in the second conduit 310 and the third flow controller 312 to open when the fluid pressure is below a predetermined value. The electric turbine generator 303 is placed in fluid communication with supply electrical energy converted from the potential energy stored in the fluid contained in the storage tank 301 to the transformer 305 and to the electrical power grid system 306.

The pump 307 aids the fluid flowing from the electric turbine generator 303 back up to the storage tank 301 so that the fluid may be recycled in the hydroelectric power system 300. This is a closed and sealed system in which the flow of the fluid there through causes a vacuum to form that aids the flow of the fluid through the hydroelectric power system 300. As a result, the amount of energy consumed by the pump 307 is reduced.

In FIG. 3, the hydroelectric power system 300 operates in a similar fashion the hydroelectric power system 100 shown in FIG. 1. However, a feedback pipe 313 is connected between the top portion of the second conduit 310 and the third flow controller 312. This feedback pipe 313 allows for recycling fluid when the third flow controller 312 determines that the fluid pressure in the second conduit 310 is below a predetermined value. The third flow controller 312 will control a valve (not shown) located at the connection point in the second conduit 310 and the third flow controller 312 to open when the fluid pressure is below a predetermined value.

Figure 4:
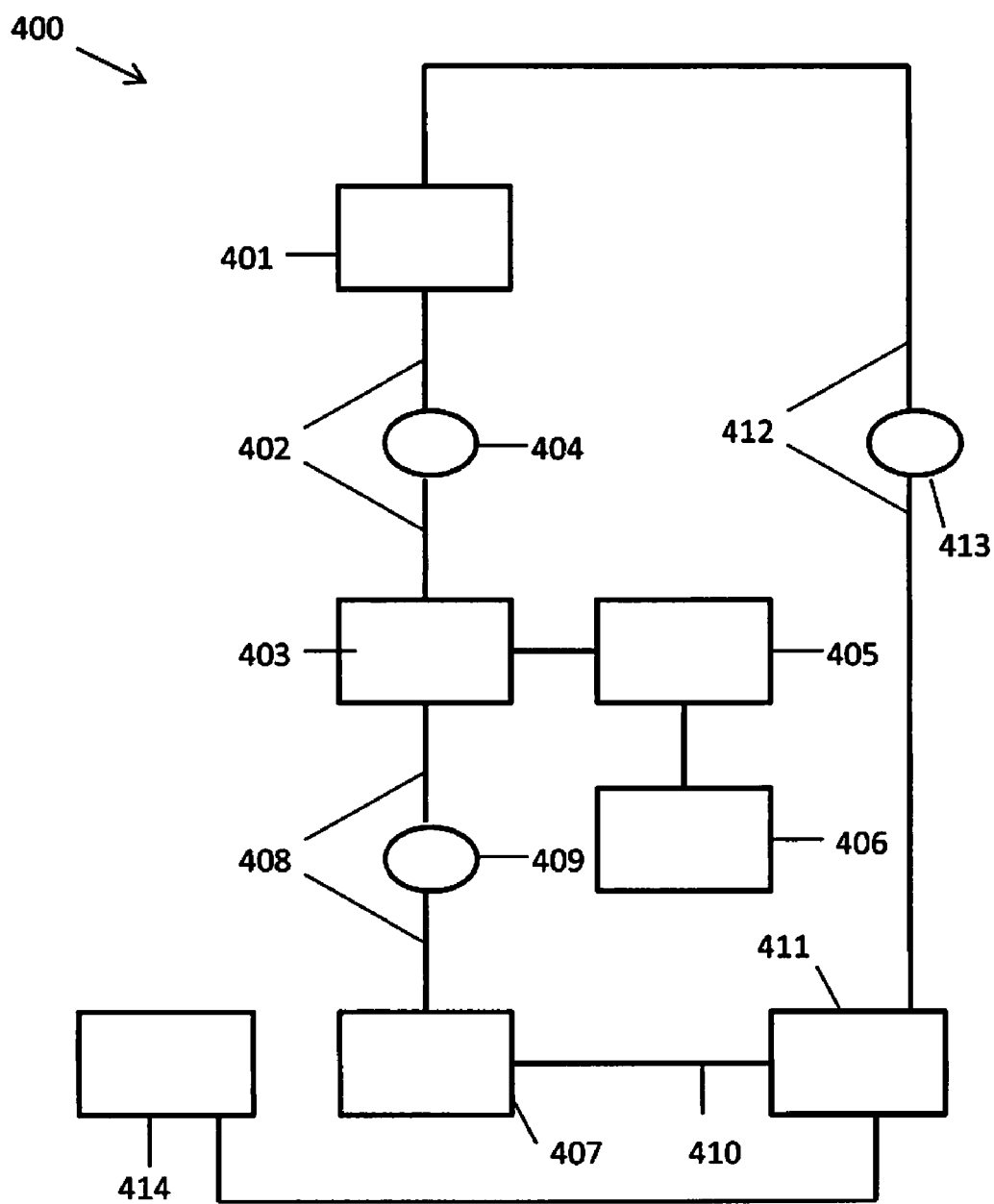
FIG. 4 is a drawing illustrating an exemplary hydroelectric power system.

FIG. 4 illustrates an exemplary hydroelectric power system 400. The hydroelectric power system 400 includes a first storage tank 401. The penstock 402 connects the storage tank 401 to an electric turbine generator 403. The penstock 402 contains the first flow controller 404, which is used to regulate the flow of the fluid from the first storage tank 401 to the electric turbine generator 403. The electric turbine generator 403 is electrically coupled to a transformer 405, which is electrically coupled to an electrical power grid system 406. The electric turbine generator 403 is also connected to a second storage tank 407 via the first conduit 408. The first conduit 408 also contains the second flow controller 409. The second storage tank 407 is placed in fluid communication with the pump 411 via the second conduit 410. The pump 411 is placed in fluid communication with the third conduit 412 to the first storage tank 401. The third flow controller 413 is also connected in-line to the third conduit 412 for regulating fluid movement through the third conduit 412. An external power source 414 supplies power to the pump 411. The electric turbine generator 403 is placed in fluid communication with supply electrical energy converted from the potential energy stored in the fluid contained in the first storage tank 401 to the transformer 405 and out to the electrical power grid system 406.

In FIG. 4, the hydroelectric power system 400 operates in a similar fashion the hydroelectric power system 100 shown in FIG. 1. However, a second storage tank 407 is used to collect the fluid passing through the electric turbine generator 403 before being returned by the pump 411 to the first storage tank 401. The use of second storage tank 407 allows for the fluid to accumulate during peak hours (i.e., when electrical demand on the power grid is the greatest) and to be pumped back into the first storage tank 401 during off-peak hours, when electrical demand is down and the cost of electricity is lower.

Figure 5:
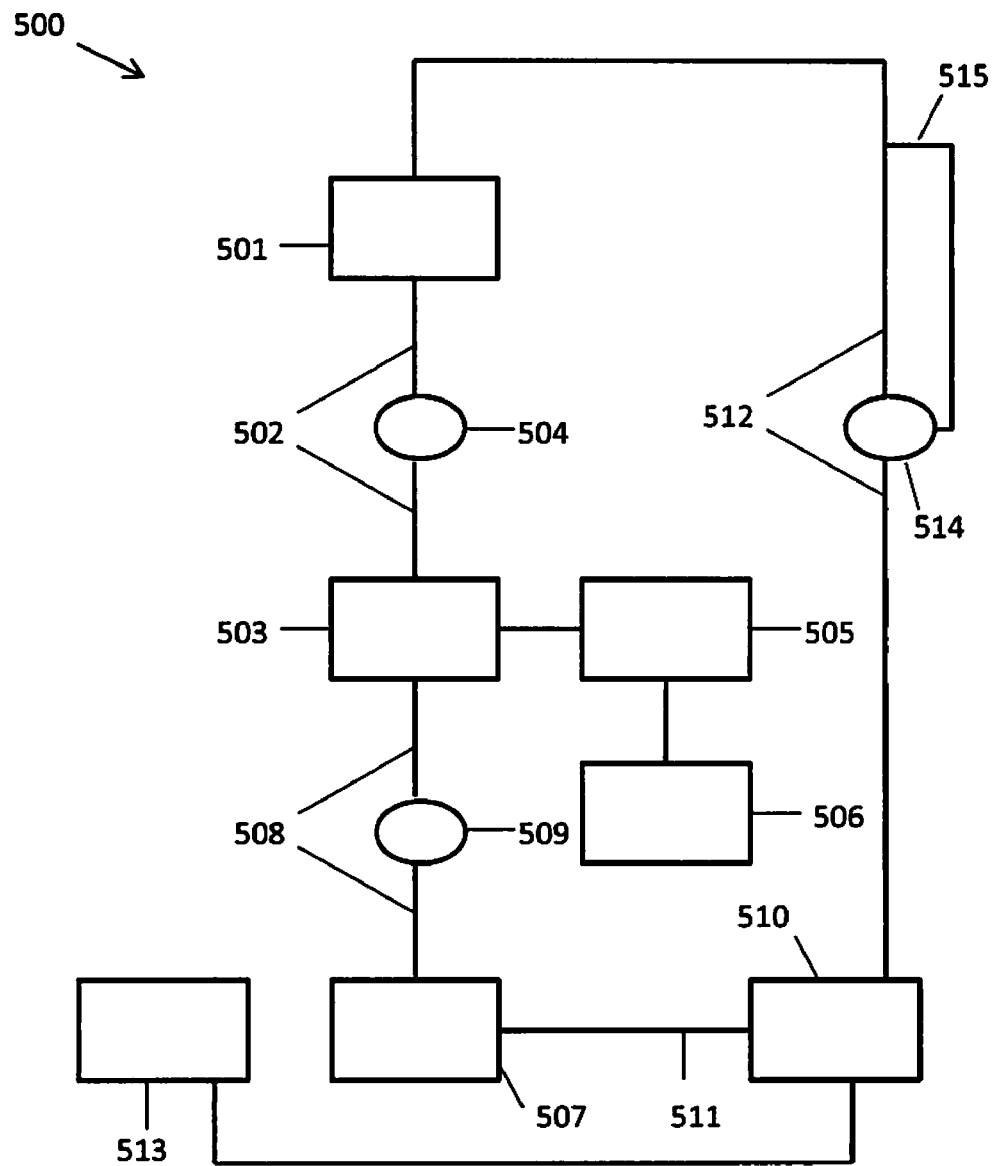
FIG. 5 is a drawing illustrating an exemplary hydroelectric power system.

FIG. 5 illustrates an exemplary hydroelectric power system 500. The hydroelectric power system 500 includes a first storage tank 501. The penstock 502 connects the storage tank 501 to an electric turbine generator 503. The penstock 502 contains the first flow controller 504, which is used to regulate the flow of the fluid from the first storage tank 501 to the electric turbine generator 503. The electric turbine generator 503 is electrically coupled to a transformer 505, which is electrically coupled to an electrical power grid system 506. The electric turbine generator 503 is also connected to a second storage tank 507 via the first conduit 508, which contains the second flow controller 509. The storage tank 507 is placed in fluid communication with the pump 510 via the second conduit 511. The pump 510 is also connected through the third conduit 512 to the first storage tank 501. The external power source 513 supplies power to the pump 510. The in-line third flow controller 514 is also connected in-line to the third conduit 512 for regulating fluid movement through the third conduit 512. A feedback pipe 515 is connected between the top portion of the third conduit 512 and the third flow controller 514 for recycling fluid when the third flow controller 514 determines that the fluid pressure in the third conduit 512 is below a predetermined value. The third flow controller 514 will control a valve (not shown) located at the connection point in the third conduit 512 and the third flow controller 514 to open when the fluid pressure is below a predetermined value. The electric turbine generator 503 is placed in fluid communication with supply electrical energy converted from the potential energy stored in the fluid contained in the first storage tank 501 to the transformer 505 and to the electrical power grid system 506.

The pump 510 aids the fluid flowing from the electric turbine generator 503 back up to the first storage tank 501 so that the fluid may be recycled in the hydroelectric power system 500. This is a closed and sealed system in which the flow of the fluid there through causes a vacuum to form that aids the flow of the fluid through the hydroelectric power system 500. As a result, the amount of energy consumed by the pump 510 is reduced.

The fluid used in the hydroelectric power system may be any viscous fluid able to flow through the system. The only limitations on the fluid being its viscosity as a non-viscous or low viscous fluid will cause the pump to consume a large amount of energy and thus reduce the advantages of the system, for example, the amount of energy converted by the electric turbine generator.

Although one storage tank, one electric turbine generator, and one pump are shown in the figures, other embodiment may utilize multiple storage tanks, multiple, electric turbine generators, multiple pumps, or combinations thereof.

Furthermore, the size of the storage tank is dependent on the amount of energy needed. If a large electrical power output is required, the system will include a larger storage tank and thus be larger than if a low power electrical system is required.

The size and number of pumps will be determined according to the amount of displaced fluid. More pumps, of the same or different types, can always be added to increase pumping capacity. Electric pumps, running on electricity generated from wind turbines or solar cells, are well developed and popular on current markets. Ultimately, the type of pumps to be used will depend on the availability of the energy sources at the site. Besides wind and sunlight, pumping energy can also be derived from waves, tidal changes, geothermal steam, conventional electrical power plants, etc.

The hydroelectric power system can be measured according to the amount of available power or energy per unit time. The power is a function of the hydraulic head and rate of fluid flow. With water in a reservoir, the head is the height of water in the reservoir relative to its height after discharge. Each unit of water can produce a quantity of work equal to its weight times the head. The amount of energy E released by lowering an object of mass m by a height h in a gravitational field is $E=mgh$, where g is the acceleration due to gravity. The energy available to hydroelectric power systems is the energy that can be liberated by lowering water in a controlled way. In these situations, the power is related to the mass flow rate (i.e., $E/t=m/t \ldots gh$). Substituting P for E/t and expressing m/t in terms of the volume of liquid moved per unit time (the rate of fluid flow $\phi$) and the density of water, this expression becomes $P=p\phi gh$. For P in watts, p is measured in $kg/m^3$, $\phi$ is measured in $m^3/s$, g is measured in $m/s^2$, and h is measured in meters.

Figure 6:
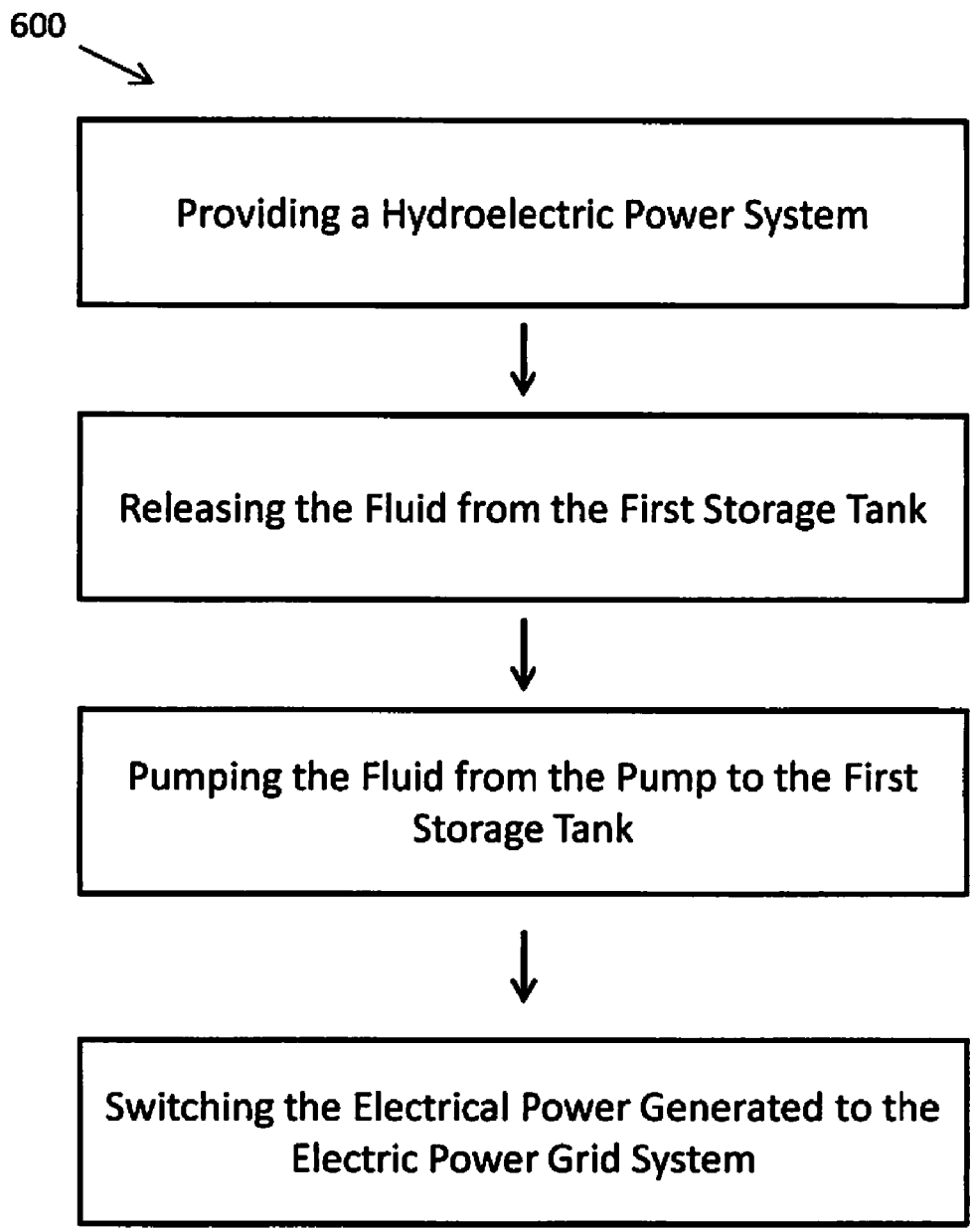
FIG. 6 is a block diagram illustrating an exemplary method of generating hydroelectric energy.

FIG. 6 is a block diagram illustrating an exemplary method of generating hydroelectric energy 600. The method includes providing a hydroelectric power system as described herein, releasing the fluid from the first storage tank through the penstock, the electric turbine generator, and the first conduit connected to the pump; pumping the fluid from the pump through the second conduit to the first storage tank to replenish the first storage tank; and switching the electrical power generated by the hydroelectric power system into the electric power grid system.

In the claims provided herein, the steps specified to be taken in a claimed method or process may be carried out in any order without departing from the principles of the invention, except when a temporal or operational sequence is explicitly defined by claim language. Recitation in a claim to the effect that first a step is performed then several other steps are performed shall be taken to mean that the first step is performed before any of the other steps, but the other steps may be performed in any sequence unless a sequence is further specified within the other steps. For example, claim elements that recite "first A, then B, C, and D, and lastly E" shall be construed to mean step A must be first, step E must be last, but steps B, C, and D may be carried out in any sequence between steps A and E and the process of that sequence will still fall within the four corners of the claim.

Furthermore, in the claims provided herein, specified steps may be carried out concurrently unless explicit claim language requires that they be carried out separately or as parts of different processing operations. For example, a claimed step of doing X and a claimed step of doing Y may be conducted simultaneously within a single operation, and the resulting process will be covered by the claim. Thus, a step of doing X, a step of doing Y, and a step of doing Z may be conducted simultaneously within a single process step, or in two separate process steps, or in three separate process steps, and that process will still fall within the four corners of a claim that recites those three steps.

Similarly, except as explicitly required by claim language, a single substance or component may meet more than a single functional requirement, provided that the single substance fulfills the more than one functional requirement as specified by claim language.

All patents, patent applications, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Additionally, all claims in this application, and all priority applications, including but not limited to original claims, are hereby incorporated in their entirety into, and form a part of, the written description of the invention. Applicants reserve the right to physically incorporate into this specification any and all materials and information from any such patents, applications, publications, scientific articles, web sites, electronically available information, and other referenced materials or documents. Applicants reserve the right to physically incorporate into any part of this document, including any part of the written description, the claims referred to above including but not limited to any original claims.

What is claimed is:

1. A hydroelectric power system comprising:
a first storage tank having an inlet and an outlet;
a fluid;
a penstock having an inlet and an outlet, wherein the inlet of the penstock is placed in fluid communication with the outlet of the first storage tank, and wherein the penstock comprises a first flow controller;
an electric turbine generator having an inlet and an outlet, wherein the inlet of the electric turbine is placed in fluid communication with the outlet of the penstock;
a transformer electrically coupled to the electric turbine generator and to an electric power grid system;
a pump having an inlet and an outlet;
a first conduit having an inlet and an outlet, wherein the inlet of the first conduit is placed in fluid communication with the outlet of the electric turbine generator and the outlet of the first conduit is placed in fluid communication with the inlet of the pump, and wherein the first conduit comprises a second flow controller;
a second conduit having an inlet and an outlet, wherein the inlet of the second conduit is placed in fluid communication with the outlet of the pump and the outlet of the second conduit is placed in fluid communication with the inlet of the first storage tank, and wherein the second conduit comprises a third flow controller; and
an external power source for controlling the pump.

2. The hydroelectric power system of claim 1, further comprising a feedback pipe having an inlet and an outlet, wherein the inlet of the feedback pipe is placed in fluid communication with the second conduit between the third flow controller and inlet of the first storage tank recycling the fluid back into the third flow controller.

3. The hydroelectric power system of claim 2, wherein the recycling the fluid back to the third flow controller occurs when the third flow controller determines that a fluid pressure within the third conduit is below a predetermined value.

4. The hydroelectric power system of claim 1, further comprising a second storage tank having an inlet and an outlet; wherein the second storage tank is placed in fluid communication with the outlet of the first conduit and the inlet of the pump.

5. The hydroelectric power system of claim 1, wherein the first storage tank, the penstock, the electric turbine generator, the pump, the first conduit, and the second conduit form a sealed container with the fluid contained therein.

6. The hydroelectric power system of claim 1, wherein the fluid is water.

7. The hydroelectric power system of claim 1, wherein the penstock conveys the fluid by gravity to drive the electric turbine generator.

8. A method of generating hydroelectric energy from a hydroelectric power system comprising
providing a hydroelectric power system comprising
a first storage tank having an inlet and an outlet;
a fluid;
a penstock having an inlet and an outlet, wherein the inlet of the penstock is placed in fluid communication with the outlet of the first storage tank, and wherein the penstock comprises a first flow controller;
an electric turbine generator having an inlet and an outlet, wherein the inlet of the electric turbine is placed in fluid communication with the outlet of the penstock;
a transformer electrically coupled to the electric turbine generator and to an electric power grid system;
a pump having an inlet and an outlet;
a first conduit having an inlet and an outlet, wherein the inlet of the first conduit is placed in fluid communication with the outlet of the electric turbine generator and the outlet of the first conduit is placed in fluid communication with the inlet of the pump, and wherein the first conduit comprises a second flow controller;
a second conduit having an inlet and an outlet, wherein the inlet of the second conduit is placed in fluid communication with the outlet of the pump and the outlet of the second conduit is placed in fluid communication with the inlet of the first storage tank, and wherein the second conduit comprises a third flow controller; and
an external power source for controlling the pump;
releasing the fluid from the first storage tank through the penstock, the electric turbine generator, and the first conduit connected to the pump;
pumping the fluid from the pump through the second conduit to the first storage tank to replenish the first storage tank; and
transferring the electrical power generated by the hydroelectric power system into the electric power grid system.

9. The method of claim 8, wherein the step of transferring further comprises:
determining the electric power output of the hydroelectric power system;
sensing a generation of a surplus electric power output by the hydroelectric power system; and
connecting the surplus electric power output to the electric power grid system.

10. The method of claim 8, wherein the fluid is water.

11. The method of claim 8, wherein the hydroelectric power system further comprises a feedback pipe having an inlet and an outlet, wherein the inlet of the feedback pipe is placed in fluid communication with the second conduit between the third flow controller and inlet of the first storage tank recycling the fluid back into the third flow controller.

12. The method of claim 8, wherein the hydroelectric power system further comprises a second storage tank having an inlet and an outlet; wherein the second storage tank is placed in fluid communication with the outlet of the first conduit and the inlet of the pump.

13. A hydroelectric power system comprising:
a first storage tank having an inlet and an outlet;
a fluid;
a penstock having an inlet and an outlet, wherein the inlet of the penstock is placed in fluid communication with the outlet of the first storage tank, and wherein the penstock comprises a first flow controller;
an electric turbine generator having an inlet and an outlet, wherein the inlet of the electric turbine is placed in fluid communication with the outlet of the penstock;
a transformer electrically coupled to the electric turbine generator and to an electric power grid system;
a pump having an inlet and an outlet;
a first conduit having an inlet and an outlet, wherein the inlet of the first conduit is placed in fluid communication with the outlet of the electric turbine generator and the outlet of the first conduit is placed in fluid communication with the inlet of the pump, and wherein the first conduit comprises a second flow controller;

a second conduit having an inlet and an outlet, wherein the inlet of the second conduit is placed in fluid communication with the outlet of the pump and the outlet of the second conduit is placed in fluid communication with the inlet of the first storage tank, and wherein the second conduit comprises a third flow controller;

an external power source for controlling the pump; and a feedback pipe having an inlet and an outlet, wherein the inlet of the feedback pipe is placed in fluid communication with the second conduit between the third flow controller and inlet of the first storage tank recycling the fluid back into the third flow controller, wherein a recycling the fluid back to the third flow controller occurs when the third flow controller determines that a fluid pressure within the third conduit is below a predetermined value, wherein the first storage tank, the penstock, the electric turbine generator, the second storage tank, the pump, the first conduit, the second conduit, the third conduit, and the feedback pipe form a sealed container with the fluid contained therein.

14. The hydroelectric power system of claim 13, further comprising a second storage tank having an inlet and an outlet; wherein the second storage tank is placed in fluid communication with the outlet of the first conduit and the inlet of the pump.

* * * * *